United States Patent [19]

Tezuka et al.

[11] Patent Number: 5,416,607
[45] Date of Patent: May 16, 1995

[54] FACSIMILE TRANSMISSION CONTROL SYSTEM WHICH DETERMINES THE PROPER RESPONSE TO A RECEIVED INSTRUCTION

[75] Inventors: Yoshiaki Tezuka; Takashi Sakayama, both of Saitama, Japan

[73] Assignee: Fuji Xerox Co., Ltd., Tokyo, Japan

[21] Appl. No.: 136,232

[22] Filed: Oct. 15, 1993

[30] Foreign Application Priority Data

Oct. 20, 1992 [JP] Japan .................................. 4-306208

[51] Int. Cl.⁶ ......................... H04N 1/00; H04N 1/32
[52] U.S. Cl. ................................. 358/468; 358/434; 358/437
[58] Field of Search ............... 358/434, 435, 436, 437, 358/438, 439, 405, 406, 468, 443; 371/32

[56] References Cited

U.S. PATENT DOCUMENTS

| | | | |
|---|---|---|---|
| 4,829,524 | 5/1989 | Yoshida | 371/32 |
| 5,041,917 | 8/1991 | Koshiishi | 358/436 |
| 5,057,938 | 10/1991 | Edamura | 358/436 |
| 5,172,246 | 12/1992 | Yoshida | 358/406 |
| 5,251,040 | 10/1993 | Saito | 358/434 |
| 5,289,582 | 2/1994 | Hirata | 358/400 |

FOREIGN PATENT DOCUMENTS

59-22479  2/1984  Japan .......................... H04N 1/32

Primary Examiner—Edward L. Coles, Sr.
Assistant Examiner—Allan A. Esposo
Attorney, Agent, or Firm—Finnegan, Henderson, Farabow, Garrett & Dunner

[57] ABSTRACT

A facsimile transmission control system having a standard facsimile procedure which generates an output when at least one line of an image is correctly decoded and receives instructions from a transmitting facsimile. The current instruction is compared with a previous instruction and a time interval between instruction is measured. A proper response to an instruction sent by the transmitting facsimile is generated by the receiving facsimile based on the generated output when at least one line is properly decoded, the comparison of the two instructions, and the time interval between the instructions.

6 Claims, 3 Drawing Sheets

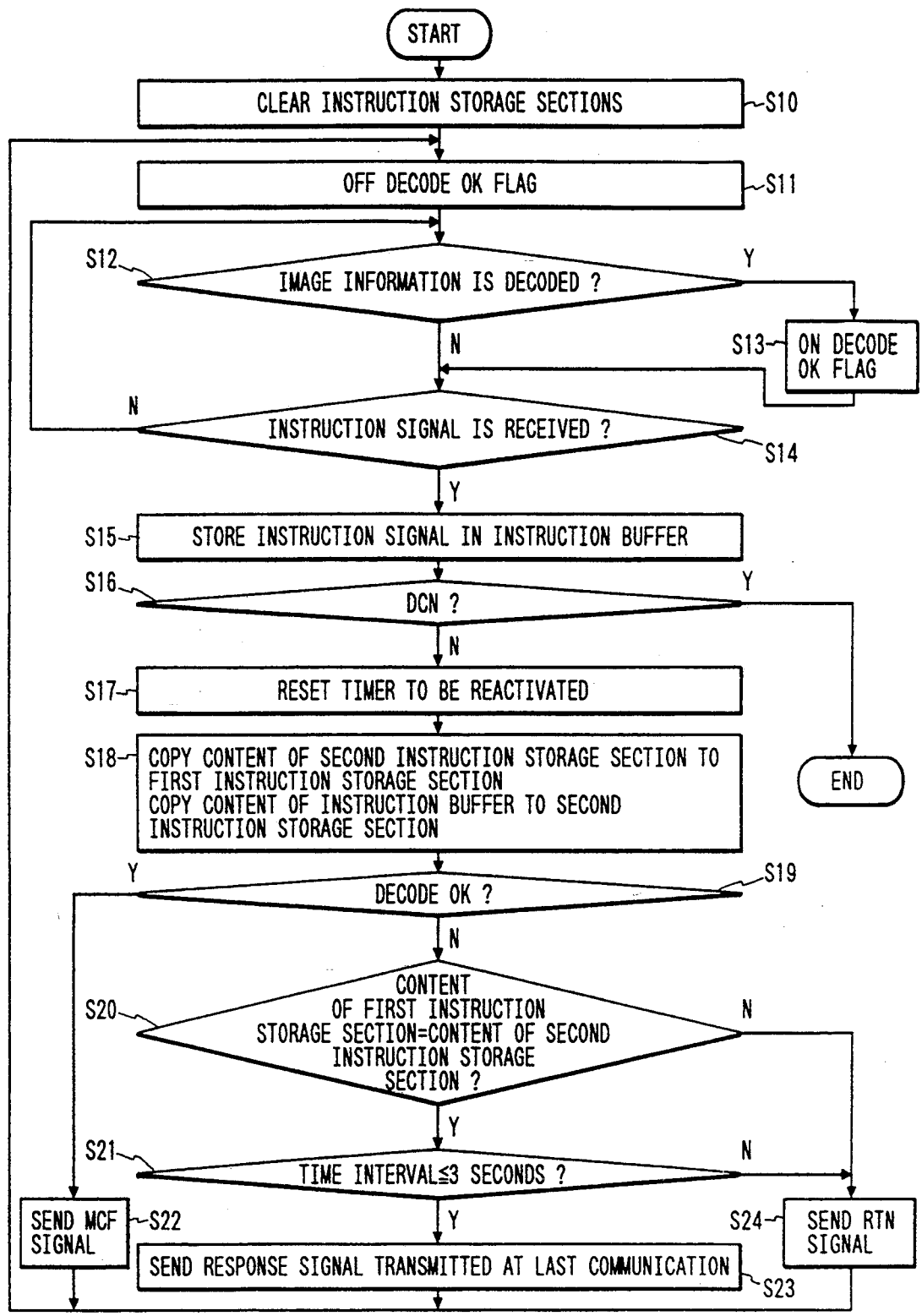

FACSIMILE TRANSMISSION CONTROL SYSTEM WHICH DETERMINES THE PROPER RESPONSE TO A RECEIVED INSTRUCTION

BACKGROUND OF THE INVENTION

The present invention relates to facsimile transmission control systems. More particularly, the present invention is directed to a facsimile transmission control system capable of outputting an appropriate response when a post-message instruction signal is received without decoding any lines of image information.

Conventional G3 facsimile transmission control procedures are standardized in the CCITT (Consultative Committee for International Telegraph and Telephone) recommendation T.30. According to this message receiving procedure, there are two possible cases where a post-message instruction signal is received without decoding any lines of image information. One case is that the post-message instruction signal is received without correctly decoding any lines of image information due to transmission errors, and the other is that the post-message instruction signal is retransmitted by a counterpart terminal since the counterpart terminal is not able to receive a MCF (Message Confirmation) signal correctly due to noise or the like.

Different responses must be given in these two cases. In the former case, a RTN (Retransmission) signal must be returned to request retransmission of the image information, whereas in the latter case, the same response as the last communication, e.g., the MCF signal, must be returned. However, to make such judgment is very difficult.

In contrast to the above-mentioned cases, Unexamined Japanese Patent Publication No. 130667/1989 proposes that a RTN signal is returned in both of the two cases. However, this system is time-consuming in terms of procedure for taking care of the latter case because the RTN signal is returned instead of the MCF signal. In addition, many facsimile machines retransmit the page concerned when the RTN signal is received. Thus, the counterpart terminal has to receive the same page twice, which is a waste of paper.

Further, Unexamined Japanese Patent Publication No. 61470/1992 proposes that an instruction signal original to a transmitting-side facsimile machine is sent before sending image information so that the counterpart terminal can be informed of the fact that the content to be next sent is a high-speed image information signal. However, this system is only valid in the original mode, thereby not being used for communications with machines of different origin.

SUMMARY OF THE INVENTION

The object of the present invention is to overcome the above-mentioned problems encountered by the conventional art and therefore to provide a transmission control system capable of selecting an appropriate response when a post-message instruction signal is received without decoding any lines of image information.

To achieve the above object, the present invention is applied to a facsimile transmission control system having a standard facsimile procedure. A facsimile transmission control apparatus of the present invention includes: an image information receiving device that generates an output when at least one line of image information is decoded correctly; an instruction signal receiving device; an instruction comparing device for comparing an instruction received at a last communication with an instruction received at a current communication; a timer device for outputting a time interval between a time at which the instruction is received at the last communication and a time at which the instruction is received at the current communication; and a response selecting device for sending a response based on the outputs of the image information receiving device, the instruction comparing device, and the timer device.

According to these devices, an appropriate response can be selected when a post-message instruction signal is received without decoding any lines of image information. As a result, the transmission time or recording paper can be saved.

BRIEF DESCRIPTION OF THE DRAWINGS

In the accompanying drawings:

FIG. 3 is a flowchart showing an operation of the embodiment of the present invention.

DETAILED DESCRIPTION OF THE PREFERRED EMBODIMENTS

An embodiment of the present invention will now be described in detail with reference to the accompanying drawings.

Figure 1:
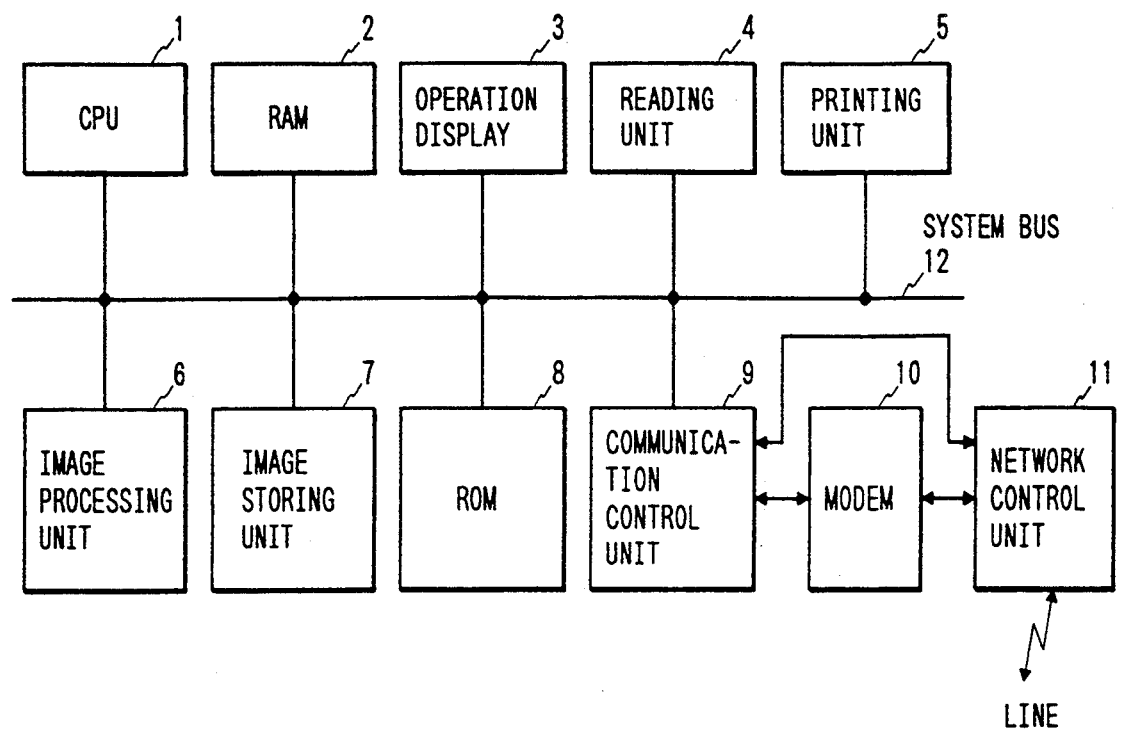
FIG. 1 is a block diagram of a facsimile machine to which the present invention is applied.

FIG. 1 is a block diagram of an embodiment of a facsimile apparatus to which the present invention is applied. A CPU 1 supervises the facsimile apparatus and processes a facsimile transmission control procedure. A RAM 2 is a work area memory used by control programs. An operation display 3 includes various operation instruction and telephone number input switches as well as LCD, LED or like indicators.

A reading unit 4 reads a document using an image sensor or the like and generates image information. A printing unit 5 prints the received image information on paper. An image processing unit 6 encodes and decodes to compress the image information generated at the reading unit 4 or expand the received information to printable information.

An image storing unit 7 stores image information. A ROM 8 stores programs for controlling the facsimile apparatus. A communicating control unit 9 contains an internal processing CPU and a ROM that stores communication control programs, and transmits commands or image data by executing, e.g., a link-level transmission control procedure.

A modem 10 has both low-speed modes for commands (e.g., V21) and high-speed modes for image data (V27ter, V29, V33, V17, etc.), and modulates the commands and image data from the communication control unit 9 by a modulating system conforming to respective standards or demodulates received signals. A network control unit 11 performs automatic call originating/call incoming operations such as calling, dialing, and disconnecting a public network, including a telephone line, and is controlled from the communication control unit 9. A system bus 12 interconnects various units within the facsimile apparatus.

An operation of the facsimile apparatus will be outlined next.

Figure 2:
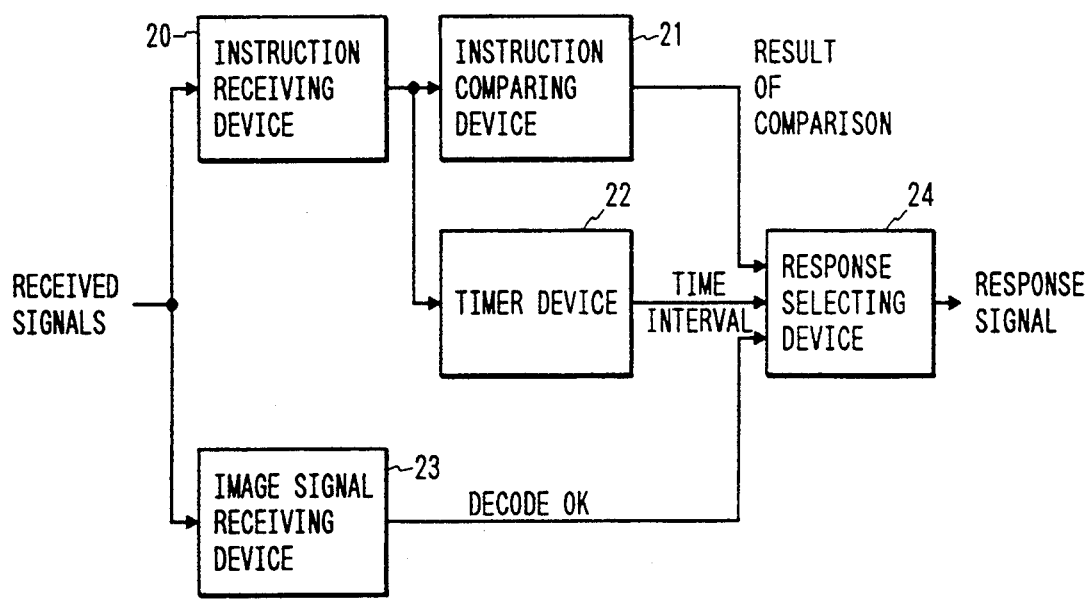
FIG. 2 is a functional block diagram of an embodiment of the present invention.

FIG. 2 is a functional block diagram showing a relationship among various functional elements in the embodiment of the present invention. An instruction receiving device 20 detects a low-speed mode signal from a communication line and outputs the content of the signal. An instruction comparing device 21, storing an instruction received at a last communication, compares the last received instruction with an instruction received at a current communication, and outputs the result of the comparison.

A timer device 22 includes a timer that activates every time an instruction signal is received, and outputs a time interval between a last instruction signal reception and a current instruction signal reception. An image signal receiving device 23 is provided to ensure detection of image information signal reception. This device 23 outputs a decode OK signal after recognizing that an image signal is received when at least one line of image information signal is decoded normally after a response signal is sent.

A response selecting device 24 determines the type of the response signal based on the outputs of the instruction comparing device 21, the timer device 22, and the image signal receiving device 23, and sends the determined type.

FIG. 3 is a flowchart showing the operation of the embodiment of the present invention in more detail. In Step S10, first and second instruction storage sections arranged on the RAM are cleared. In Step S11, a decode OK flag is reset to OFF. The decode OK flag is set when at least one part, e.g., a single line, of image information signal is decoded correctly.

In Step S12, whether or not the image information is decoded correctly is checked. If the image information is decoded correctly, the decode OK flag is set to ON in Step S13. In Step S14, whether or not an instruction signal is received is checked. If the instruction signal is not received, low-speed mode and high-speed mode signal monitoring is repeated in Step S12.

If the instruction signal is received in Step S14, then the received instruction signal is stored in an instruction buffer on the RAM in Step S15. In Step S16, whether or not the stored instruction signal is a DCN (Disconnect Instruction) signal is determined. If the answer is affirmative, the communication line is disconnected to end the communication.

If the timer is not activated, in Step S17 the timer is caused to activate. If the timer has already been activated, then the count is stored in a predetermined area, and the timer is reset to be reactivated. The timer is provided to measure the reception time interval between instruction signals.

In Step S18, the content of the second instruction storage section (an instruction signal received at a last communication) is copied to the first instruction storage section. The content of the instruction buffer, which is a FCF (Facsimile Control Field) part of the instruction signal format, is copied to the second instruction storage section. This operation allows the instruction received at the last communication to be stored in the first instruction storage section and the instruction received at the current communication to be stored in the second instruction storage section.

In Step S19, whether or not the image information is received is verified by checking the decode OK flag. If the decode OK flag is set, a MCF signal is returned as a response in Step S22. If, however, the flag is reset, then whether or not the content in the first instruction storage section and the content in the second instruction storage section aye identical is checked in Step S20.

If the contents are found to be different in Step S20, then it is recognized that the previously sent response signal is received by the counterpart terminal and that the image information sent from the counterpart terminal is not received correctly. As a result, a RTN signal is sent to request retransmission in Step S24. If the contents are found to be identical in Step S20, then Step S21 is executed.

In Step S21, whether or not the time interval from the instruction signal at the last communication measured in Step S17 equals an instruction retransmission time predetermined by the procedure. The time interval is usually equal to 3 seconds. Whether or not the measured time interval is within 3 seconds plus or minus an error is checked. If the measured time interval is within such range, it is recognized that the retransmission is made, and Step S23 is executed. If the measured time interval is not within such range, then Step S24 is executed. Since the transmission of image information seldom ends within 3 seconds or less, it may be designed so that any transmissions lasting 3 seconds or less are regularly recognized as retransmissions.

It is when the image information is received correctly that Step S22 is executed. A MCF signal indicating that the image information has been received correctly is sent in this step. To retransmit a post-message instruction signal, Step S23 is executed. A response signal transmitted at the last communication is sent in this step. When the image information is not received correctly, Step S24 is executed. A RTN signal for requesting retransmission of the image information is sent in this step. After Step S22, S23 or S24 is executed, Step S11 is executed again to monitor the reception of next image information or a next instruction signal.

Figure 4A:
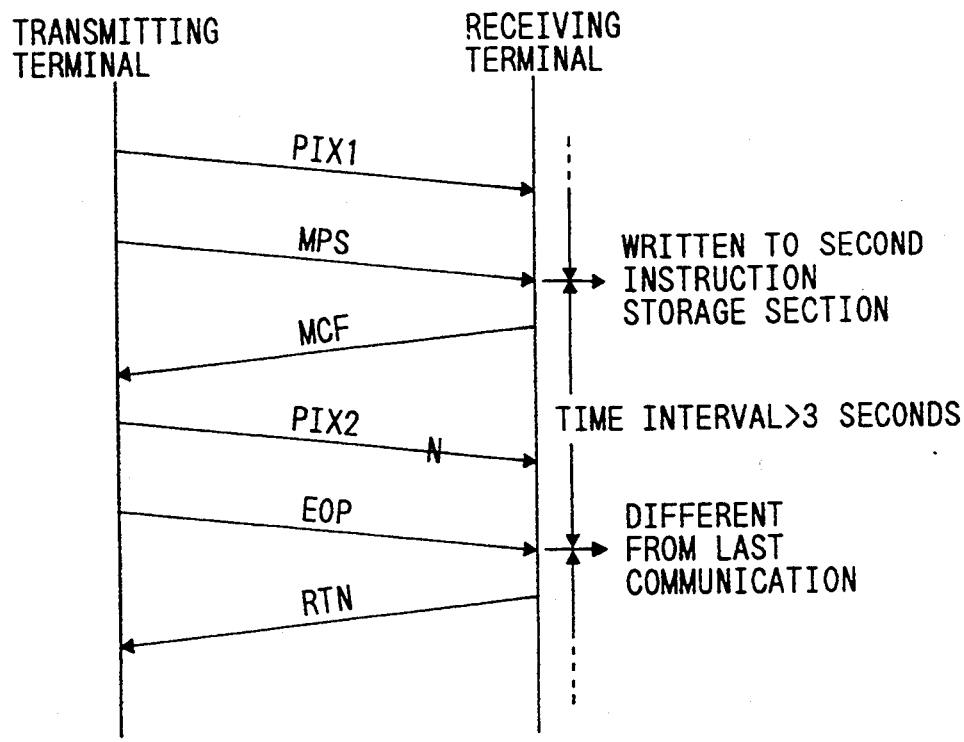
FIGS. 4(a) and (b) are diagrams illustrative of a transmission procedure according to the present invention.
Figure 4B:
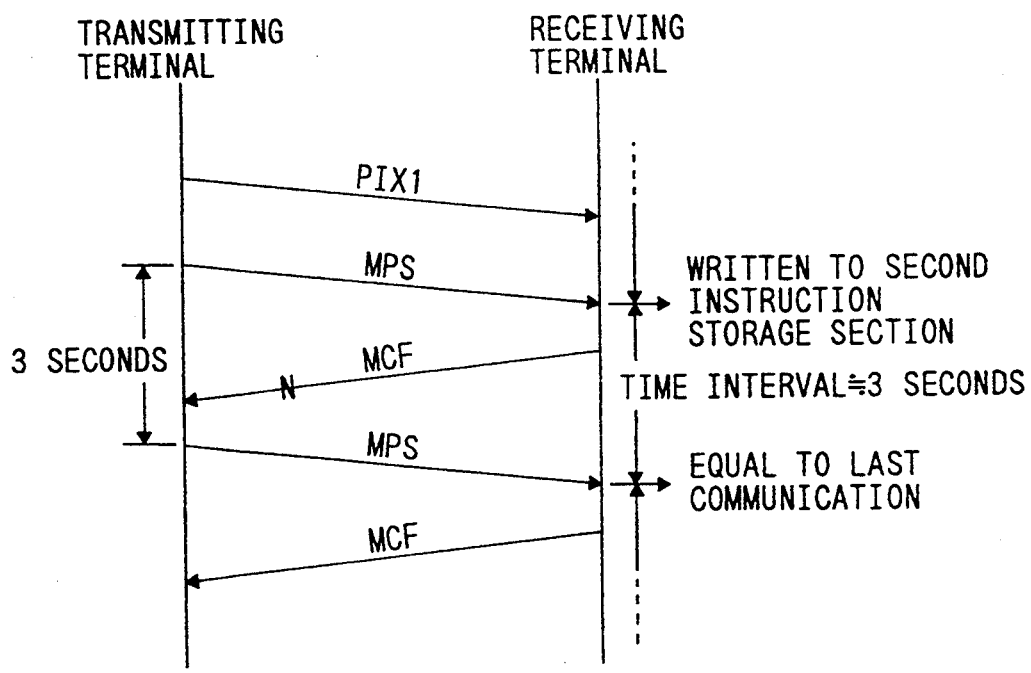

FIGS. 4(a) and (b) are time charts showing an exemplary transmission control procedure according to the present invention. Cases where a two-page original is transmitted are shown. Explaining a case (a), the procedure starts with call originating, followed by negotiation, although these steps are not shown. Then, image information PIX1 is transmitted from a transmitting terminal in the high-speed mode. Successively, a MPS (Multi-page Signal) signal indicating the end of the page is transmitted in the low-speed mode.

When a receiving terminal has received the image information PIX1 and the MPS signal correctly, the MPS signal is written to the second instruction storage section, and the timer is reactivated and a MCF signal acknowledging receipt is returned. The transmitting terminal transmits image information PIX2 of the next page, and transmits an EOP signal indicating the end of the final page. However, if none of the lines of the image information PIX2 is decoded by the receiving terminal due to transmission errors or the like, then the receiving terminal receives the EOP signal after the MCF signal is sent.

In this case, the instruction signal received at the current communication and the signal received at the last communication are compared. The result is that these EOP and MPS signals are different. Therefore, it can be judged that image information is missing. Thus, the RTN signal is sent. While the instruction signals are different since the original in this example happens to be in 2 pages, the MPS signal is transmitted again in the case of an original having 3 or more pages. In such a case, whether or not the time interval from the reception of the last instruction signal is equal to, e.g., 3 seconds, which is an instruction retransmission time defined by the procedure, is checked. As long as the image information is set, there are few cases where the time interval is equal to 3 seconds or less. Therefore, it can be judged in this case also that the image information is missing.

Then, a case (b) is explained. Although not shown, the procedure starts with call originating, followed by negotiation. Then, the image information PIX1 is transmitted in the high-speed mode from the transmitting terminal. Successively, the MPS signal indicating the end of the page is transmitted in the low-speed mode.

When the receiving terminal is received the image information PIX1 and the MPS signal correctly, the receiving terminal writes the MPS signal to the second instruction storage section, and reactivates the timer and returns the MCF signal, which is a response acknowledging receipt. However, if the MCF signal is not received by the transmitting terminal due to noise or the like, the transmitting terminal retransmits the MPS signal, e.g., after 3 seconds being the retransmission time of the instruction signal defined by the procedure.

The receiving terminal receives the MPS signal without image information in spite of having returned the MCF signal. When the current instruction signal and the last instruction signal are compared, both the signals are found to be identical to the MPS signals. Thus, whether or not the time interval is equal to 3 seconds, which is the retransmission time of an instruction defined by the procedure, is checked. In this case, since the signal is retransmitted by the transmitting terminal 3 seconds after the last transmission, the time interval measured by the receiving terminal is equal to almost 3 seconds. Therefore, it is judged that the MCF signal is not received correctly by the counterpart terminal in this case, so that the MCF signal is transmitted again.

Thus, an appropriate response can be sent when the image information is not received at all and when the post-message instruction signal is received.

As described in the foregoing pages, the transmission control system of the present invention can select an appropriate response in the case where a post-message instruction signal is received without decoding a single line of image information, thereby providing the advantage that transmission time or recording paper can be saved.

Moreover, the transmission control system of the present invention can be applied to communications with apparatuses of different origin since no special signals are used.

What is claimed is:

1. A facsimile transmission control apparatus having a standard facsimile procedure, comprising:

an image information receiving means for generating an output signal when at least one line of image information is decoded correctly;

an instruction signal receiving means for receiving an instruction signal;

an instruction comparing means for comparing an instruction signal received at a current communication with an instruction signal received at a last communication; and a response selecting means for sending a response signal for requesting retransmission by judging that image information is missing when said instruction signal received at the current communication is different from said instruction signal received at the last communication without decoding any lines of image information in accordance with said output signal of said image information receiving means and an output signal from said instruction comparing means.

2. A facsimile transmission control apparatus having a standard facsimile procedure, comprising:

an image information receiving means for generating an output signal when at least one line of image information is decoded correctly;

an instruction signal receiving means for receiving an instruction signal;

a timer means for outputting a time interval signal of a time interval between a time at which said instruction signal is received at a last communication and a time at which said instruction signal is received at a current communication; and a response selecting means for sending a response signal identical to a last response signal sent at the last communication by judging that said last response signal is missing when said instruction signal is received at said time interval equal to a retransmission time without decoding any lines of image information in accordance with said time interval signal of said timer means and said output signal of said image information receiving means.

3. The facsimile transmission control apparatus of claim 1, further comprising a timer means for outputting a time interval signal of a time interval between a time at which said instruction signal is received at the last communication and a time at which said instruction signal is received at the current communication.

4. The facsimile transmission control apparatus of claim 3, wherein said response selecting means sends a response signal identical to a last response signal sent at the last communication by judging that said last response signal is missing when said instruction signal is received at said time interval equal to a retransmission time, in accordance with said time interval signal of said timer means when said instruction signal received at the current communication is equal to said instruction signal received at the last communication.

5. The facsimile transmission control apparatus of claim 4, wherein said retransmission time is preset with three seconds.

6. A facsimile transmission control method for outputting an appropriate response when a post-message instruction signal is received without decoding any lines of image information, comprising the steps of:

checking whether or not said image information is decoded correctly;

checking whether or not an instruction signal is received;

activating a timer for measuring a time interval between a time at which said instruction signal is received at a last communication and a time at which said instruction signal is received at a current communication;

checking whether or not said instruction signal received at the last communication is identical to said instruction signal received at the current communication;

sending a response signal for requesting retransmission when said instruction signal received at the current communication is different from said instruction signal received at the last communication;

checking whether or not said time interval measured by said timer is equal to a predetermined time; and sending a response signal identical to a last response signal sent at the last communication when said time interval measured by said timer is equal to said predetermined time.

* * * * *